March 8, 1932. H. L. GEBERT ET AL 1,848,471

LINK CONNECTION

Filed March 16, 1929

Inventors
Howard L. Gebert
Alfred W. Place
By Owen & Owen
Attorneys

Patented Mar. 8, 1932

1,848,471

UNITED STATES PATENT OFFICE

HOWARD L. GEBERT AND ALFRED W. PLACE, OF BOWLING GREEN, OHIO, ASSIGNORS TO THE UNIVERSAL MACHINE COMPANY, OF BOWLING GREEN, OHIO, A CORPORATION OF OHIO

LINK CONNECTION

Application filed March 16, 1929. Serial No. 347,657.

This invention relates to a link connection adapted to be used where a universal movement and automatic take up for wear are desirable, as for example, in the radius rod or in the drag link connection for the steering mechanism of a motor vehicle. Heretofore, it has not been practical to use a ball type connection for such purposes except in comparatively light vehicles, owing to the difficulty of providing such a connection with an automatic take up which could withstand the trmemendous strain imposed by a heavy load. With this in mind, it is the object of our invention to provide a connection of this kind which can be safely used on any vehicles, no matter how heavy the load may be.

The novel features of the invention also have other advantages which will be more particularly explained in connection with the accompanying drawings illustrating in detail the preferred embodiment thereof.

Figure 1:
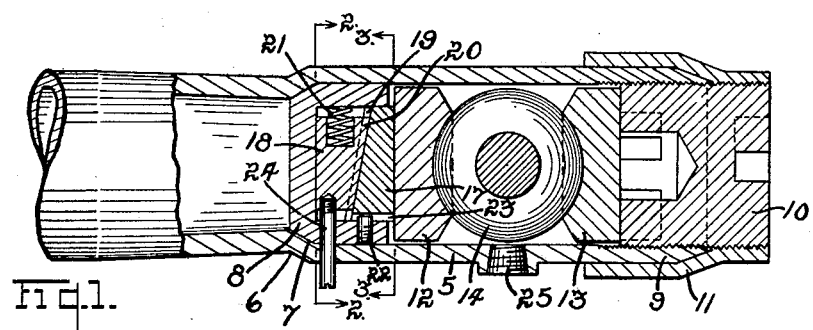
Figure 1 is a central longitudinal section of a portion of a link embodying the invention.
Figure 2:
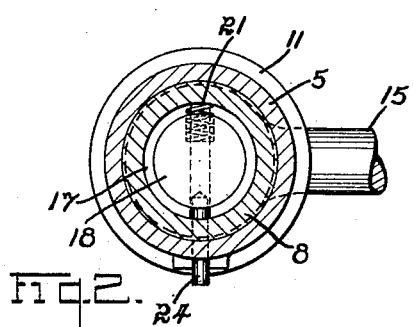
Figure 2 is a transverse section taken on the line 2—2 of Figure 1.
Figure 3:
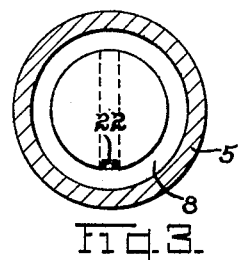
Figure 3 is a transverse section taken on the line 3—3 of Figure 1.
Figure 4:
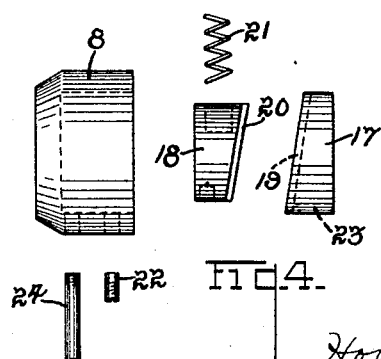
Figure 4 is a detail view of the various elements of the invention disassembled.

In the present adaptation of the invention, as shown in the drawings, the link 5 is in the form of a seamless tubular bar swaged at 6 to form an internal seat 7 for a cup shaped housing 8 which carries the elements of the automatic take up device. The end portion 9 of the tubular bar 5 is internally threaded to receive a plug 10, which may be adjusted to the proper position and secured in such position by a locking collar 11, as will be readily understood. Within the bar 5, between the cup 8 and the plug 10, are opposed bearing blocks 12 and 13, which are adapted to receive the spherical head 14 of the connecting arm 15.

The block 12 is seated against an abutment member 17 which is guided within the cup 8 for slidable adjustment longitudinally of the link 5, and behind this abutment member is a wedge member 18 which is guided for transverse movement. The co-engaging surfaces of the members 17 and 18 are inclined so that the member 18 has a wedging action, and the rear face of the member 17 is preferably formed with a channel or groove 19 while the wedge face of the member 18 is formed with a corresponding tongue 20 to facilitate the assembly of the two members in proper relative position. A coil spring 21 acts on the member 18 to exert the necessary pressure against the abutment member 17 to automatically maintain the bearing blocks in proper engagement with the head 14 and to provide take up for wear.

It is essential that the co-engaging surfaces of the members 17 and 18 should have the proper inclination so that the pressure of the spring 21 will automatically advance the wedge member 18 while back pressure from the bearing block 12 through the member 17 cannot force the wedge member 18 backwardly against the spring 21. It has been found that the ideal results for a radius rod will be obtained if the inclination of these co-engaging surfaces forms an angle of approximately fourteen degrees with the rear surface of the wedge member 18 which is perpendicular to the longitudinal center line of the link 5. For other steering connections, a greater angle is found desirable.

The rotational movement of the abutment member 17 is prevented by a screw threaded pin 22 which extends through the wall of the cup 18 into a keyway 23 formed in the side of the abutment member. A pin 24 is mounted in the wedge member 18 and extends through the side of the link 5. Thus the pins 22 and 24 supplement the tongue and groove 19, 20 in maintaining the two members 17 and 18 in proper position to prevent binding and in keeping the opposite faces of these members parallel to the bottom of the cup.

The pin 24 may also be used to force back the wedge member against the spring 21 to loosen the bearing blocks. This relief of the bearing blocks permits a clearance between them so that lubricant may be forced into direct contact with the bearing surfaces when it is introduced into the bearing after removal of a plug 25 provided for that purpose. When, by reason of wear, the wedge member 18 has advanced as far as is permitted by the side of the cup 8, it may be forced back by means of the pin 24, while the bearing block 13 is taken up by advancing the plug 10 after the locking collar has been loosened. This readjustment can be repeated as long as the condition of the bearings permits it.

By means of the above construction, we have provided a link connection which has all the advantages of a universal movement, which is automatically adjustable to compensate for wear, and which cannot pull apart, the angle of inclination of the co-engaging surfaces of the members 17 and 18, in the case of the radius rod, being so chosen as to permit the member 18 to advance freely without causing unnecessary tightness of the bearings, while at the same time, it is impossible for any strain on the bearings to force member 18 back against the spring. When the invention is used in a steering connection, a greater angle is desirable, so that under certain circumstances, the member 18 may be forced outwardly against the spring 21.

While we have shown and described in detail the preferred embodiment of the invention, it is to be understood that the same may be considerably modified without departing from the scope of the invention as defined in the appended claims.

What we claim is:

1. A link of the class described comprising a tube with opposed bearing blocks therein, abutment members which are housed within said tube and against which the respective bearing blocks seat, one of said members being slidable longitudinally of the tube and formed with a rear inclined surface, a cupped seat within said tube, a wedge member housed within said cupped seat, and slidable transversely thereof and having an inclined face bearing against the inclined face of the abutment member, and a spring within said seat tending to advance said wedge member.

2. A link of the class described comprising a tube with opposed bearing blocks therein, abutment members against which said bearing blocks seat, one of said members being slidable longitudinally of the tube and formed with a rear inclined surface, a cupped seat within said tube behind the slidable member, a wedge member housed within said cupped seat and slidable transversely thereof and having an inclined face bearing against the inclined face of the slidable abutment member, the co-engaging inclined faces having a tongue and groove connection to facilitate their assembly in proper relative position, a spring within the seat tending to advance said wedge member, and means for keying at least one of said co-engaging members to the cupped seat.

3. A link of the type set forth including a tube having a circular seat on its interior and at right angles to the axis of the tube, a supporting member extending transversely of the axis of the tube engaged against said seat, opposed bearing blocks in the tube, abutment members within the tube against which the respective bearing blocks seat, one of said members being slidable longitudinally of the tube and formed with a rear inclined surface, a wedge member engaged with said supporting member and having its wedge face engaged with the inclined face of said abutment member, and spring means to advance the wedge member.

4. In a link of the type set forth, a tube, opposed bearing blocks in the tube, a pair of abutment members within the tube and against which the respective bearing blocks seat, one of said members being slidable longitudinally of the tube and having a rear inclined face, a wedge member slidable transversely of the tube and having an inclined face engaging the inclined face of said abutment member, means to provide a seat for the wedge member to permit sliding thereof, spring means to advance the wedge member, manually operable means connected to the wedge member and extending outwardly of the tube to move the wedge member against the action of the spring and thus release the wedging engagement between the wedge member and said abutment member, and means to adjust one of the bearing blocks upon said movement of the wedge member thereby to adjust the latter following wear.

In testimony whereof we have hereunto signed our names to this specification.

HOWARD L. GEBERT.
ALFRED W. PLACE.